Patented Sept. 8, 1953

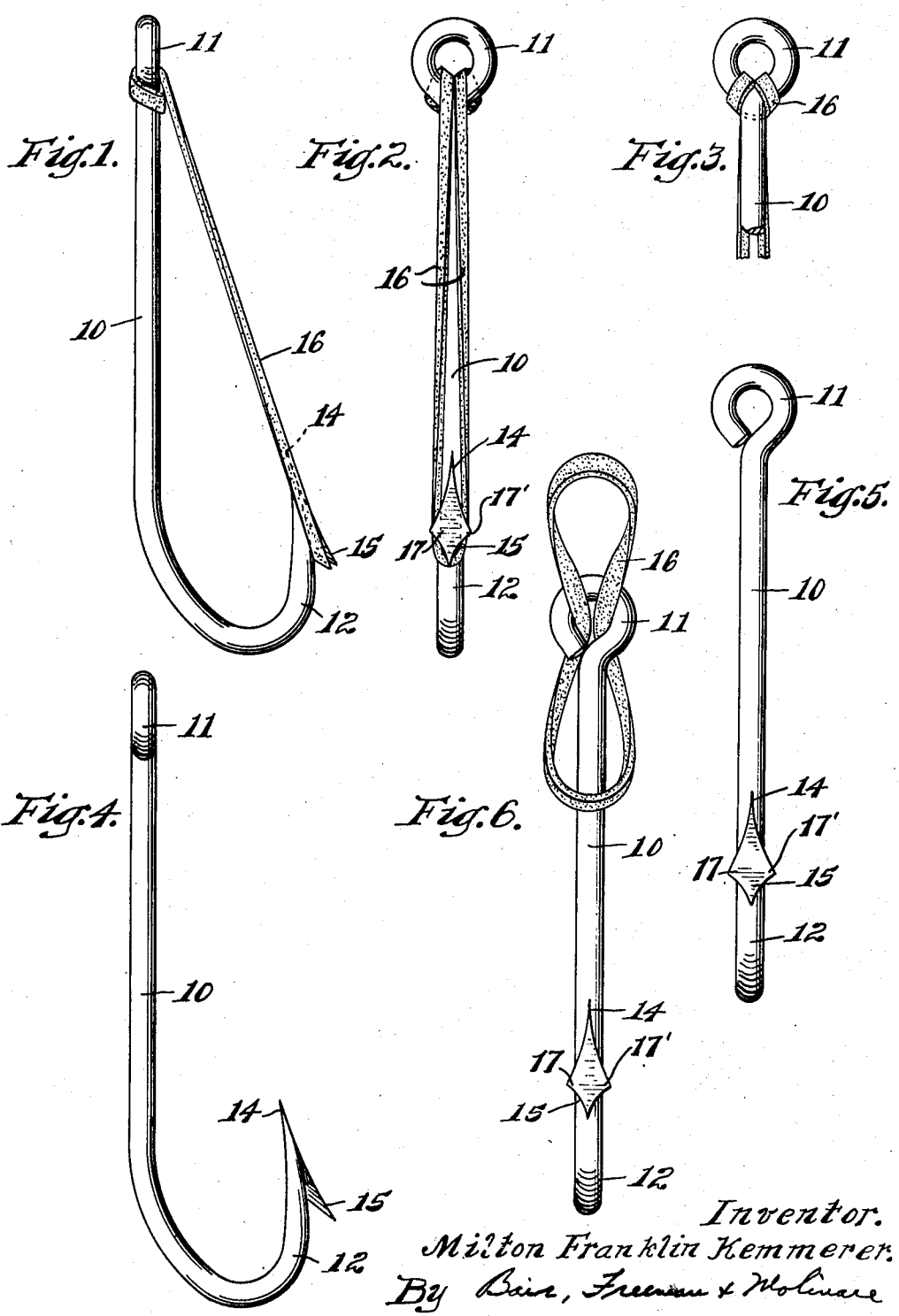

2,651,134

UNITED STATES PATENT OFFICE 2,651,134

WEEDLESS FISHHOOK

Milton Franklin Kemmerer, Waterloo, Iowa

Application October 7, 1950, Serial No. 189,020

2 Claims. (Cl. 43—43.4)

This invention relates to certain novel and useful improvements in fish hooks, and more particularly fish hooks of the so-called weedless type including a guard member which tends to preclude snagging or catching of the hook proper on weeds and other objects in the water incident to being drawn through the water while trolling or casting.

The invention contemplates the provision of a novel form of hook having a barb located on the outside of the reversely bent portion of the hook adjacent the sharp pointed tip together with the provision of a resilient guard member such as a rubber band adapted to be positioned to bridge the gap between the terminal portion of the hook and the ring or eyelet at the free end of the shank of the hook.

One of the objects of this invention is to provide an improved weedless fish hook having a resilient guard member secured at one end to the ring or eyelet on the free end of the shank of the hook, and the opposite portion of the guard means being looped around the barb, and the barb and the sharp pointed tip of the hook being so correlated to each other and to the ring or eyelet portion of the hook as to cause the resilient member to be disposed outwardly beyond the tip to insure providing an efficient guard for protecting the tip and precluding it from becoming snagged on weeds or other objects in the water in the process of trolling or casting.

Another object is to provide an improved weedless fish hook wherein the barb is located on the outside of the reversely bent portion of the hook adjacent the tip and the tip portion of the hook extending in a plane passing substantially through the ring or eyelet portion at the free end of the shank.

A further object is to provide an improved weedless fish hook which affords convenience in placing of bait thereon or removal therefrom, and which will not cause interference with catching of the fish or in any way hamper removal thereof from the hook.

Still another object is to provide an improved weedless fish hook which is effective, durable, and capable of being economically manufactured.

Other objects and advantages of this invention will be apparent from the following description taken in connection with the accompanying drawings, in which:

Figures 1 and 2 are side and front elevational views respectively of the weedless fish hook embodying the present invention with the guard element shown in opposite position;

Figure 3 is a fragmentary rear elevational view of the weedless fish hook showing the manner of attachment of the guard member to the eyelet or ring portion of the hook;

Figures 4 and 5 are side and front elevational views respectively of the hook proper, and Figure 6 is a front elevational view showing the resilient guard member in an intermediate position for securement to the hook proper.

The term "weedless" fish hook is intended to comprehend both the hook proper and guard means associated therewith. As illustrated in the drawing, the fish hook proper is formed from a cylindrical rod or wire, and includes a shank portion 10 formed at one end into a ring or eyelet 11 for attachment to a fishing line. The opposite portion of the shank extends into a reversely bent portion 12 of generally semi-circular contour, the end of which terminates in a sharp point 14. On the outer surface of the reversely bent portion adjacent the tip 14 is a barb 15. The surface intermediate the barb 15 and the tip 14 is of slightly concave contour as seen in Figure 4 of the drawing, and in front elevation, is of slightly irregular diamond-shaped formation.

The diamond-shaped portion of the fish hook defines a pair of laterally disposed points 17 and 17' which extend in opposite directions beyond the projected width of the shank portion 10 as clearly seen in Figures 2, 5 and 6.

The guard element herein designated at 16 is preferably a resilient or elastic member such as a rubber band. The rubber band is first slipped over the shank portion of the hook and the portion extending in the direction opposite from the pointed tip is drawn upwardly through the ring or eyelet 11 and then drawn in a downwardly direction to firmly constrict the portions of the rubber band around the lower portion of the eyelet at opposite sides of the shank, as seen in Figures 2 and 3 of the drawing. The free end portion of the rubber band is then drawn downwardly and the band is tensioned and the free portion is then anchored beneath the barb 15 and passes beneath the laterally disposed points 17 and 17' as clearly seen in Figures 1 and 3 of the drawing. The laterally disposed points 17 and 17' overlying the strands of rubber band 16 engage said strands and keep the rubber band 16 from slipping off the tip end of the fish hook.

The tip 14 and barb 15 are so correlated with respect to each other and to the eyelet or ring member that they lie in a plane passing substantially through the ring or eyelet 11. By virtue of such relationship of the tip and barb, and as may be clearly seen in Figure 1 of the drawing, the two strands of the rubber band of the guard member when in operative position, lie on opposite sides of the point 14 with their outermost edges being disposed outwardly beyond the tip 14. Thus, the two strand portions of the rubber band will always be brought into contact with weeds or other objects in the water in the process of fishing and serve to prevent the sharp pointed tip 14 from becoming snagged or engaged with weeds and other objects. The rubber band thus serves as an effective resilient guard, protecting the tip 14 at all times. Due to the resiliency of the rubber band, it in no wise interferes with the usual function of the hook in catching of fish and it does not interfere with convenient removal of the hook from the fish. Due to the simplicity of the construction, the guard member may be quickly and easily removed from or placed in operative position for purposes of placing of bait on the hook or removal of bait therefrom.

It will be apparent that the present invention may be embodied in a single or double type fish hook and also lends itself for adaptation to various fishing lures such as spoons, plugs, or other artificial bait.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. The combination of a fish hook having an eye at one end thereof, a shank extending from the eye, said shank having a bend at the opposite end thereof terminating in a pointed tip, said tip having a barb formation on the outer side thereof having a diamond shaped face providing laterally extending projections and a downwardly extending projection, and an elastic band of loop form having one portion of the loop surrounding the shank, the sides of the loop extending through the eye and another portion of the loop extending from the eye downwardly and adapted to be extended over the barbed tip so that the entire width of the band is held against a portion of the bend of the shank under the lateral projections of the barb, said lateral projections extending a greater distance thereacross than the width of the shank.

2. The combination of a fish hook having an eye at one end thereof, a shank extending from the eye, said shank having a bend at the opposite end thereof terminating in a pointed tip, said tip having a barb formation on the outer side thereof having a diamond shaped face providing laterally extending projections and a downwardly extending projection, and an elastic band of loop form having one portion of the loop surrounding the shank, the sides of the loop extending through the eye and another portion of the loop extending from the eye downwardly and adapted to be extended over the barbed tip so that the entire width of the band is held against a portion of the bend of the shank under the lateral projections of the barb, said lateral projections extending a greater distance thereacross than the width of the shank, the width of said loop of the elastic band which is adapted to be extended over the barbed tip being less than the distance between the tip of the downwardly extending projection of the barb and the adjacent surface of the shank bend.

MILTON FRANKLIN KEMMERER.

References Cited in the file of this patent

UNITED STATES PATENTS

| Number | Name | Date |
|---|---|---|
| 889,356 | Carpenter | June 2, 1908 |
| 1,191,031 | Peters | July 11, 1916 |

FOREIGN PATENTS

| Number | Country | Date |
|---|---|---|
| 10,056 | Great Britain | June 2, 1904 |
| 21,860 | Great Britain | June 3, 1909 |
| 459,571 | Canada | Sept. 13, 1949 |